Patented Feb. 28, 1928.

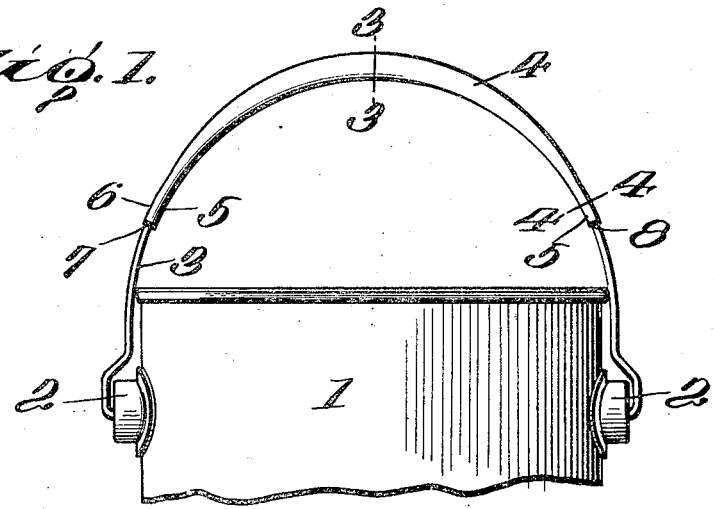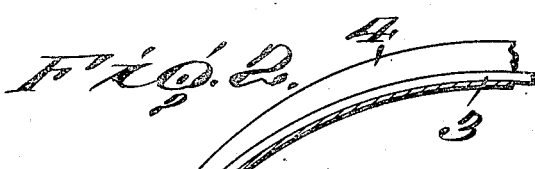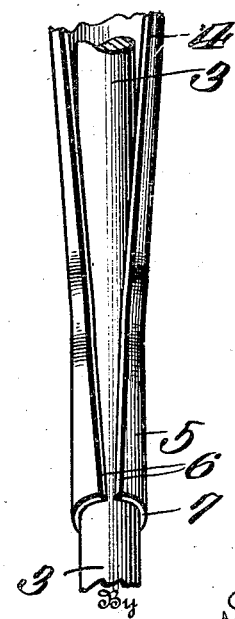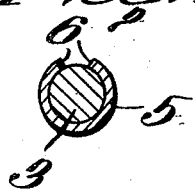

1,660,841

UNITED STATES PATENT OFFICE.

WILLIAM W. HODGSON AND JOSEPH J. ENGELMAN, OF CHICAGO, ILLINOIS, ASSIGNORS TO CONTINENTAL CAN COMPANY, INC., OF NEW YORK, N. Y., A CORPORATION OF NEW YORK.

HANDLE FOR PAILS.

Application filed April 28, 1926. Serial No. 105,300.

The invention relates to new and useful improvements in handles for pails, and more particularly to a handle for a pail which is adapted for storing heavy liquids or ingredients such as paints and the like.

An object of the invention is to provide a combined curved wire bail handle and sheet metal guard which is attached to the bail so as to be rigidly secured thereto by a bending of the metal forming the guard, and wherein said guard is curved so as to conform to the curvature of the wire bail and make contact therewith from one end of the guard to the other end thereof, said guard being formed from a sheet metal blank substantially lenticular in shape.

A further object of the invention is to provide a handle for pails of the above type wherein the guard extends from a point substantially adjacent one side of the pail to a point substantially adjacent the other side of the pail, thereby engaging the bail throughout an extended arc so that said guard is held by the curvature of the bail from rotating on the bail.

In the drawings—

Figure 1 is a view partly in side elevation and partly broken away, showing the pail with the improved bail attached thereto;

Fig. 2 is an enlarged sectional view through the guard showing one-half of the handle;

Fig. 3 is a section on the line 3, 3 of Fig. 1;

Fig. 4 is a section on the line 4, 4 of Fig. 1, and

Fig. 5 is a view on an enlarged scale in perspective showing a portion of the end of the guard and the bail.

The invention is directed broadly to a handle for pails or metal containers which is made from wire and sheet metal. The wire is formed into the usual curved wire bail and attached to the pail so as to pivot thereon. The sheet metal is formed into a hand guard and rigidly attached to the bail. This sheet metal hand guard is formed from a blank which is substantially lenticular in shape. It is curved from end to end to conform to the curvature of the bail. It is also curved transversely to form a substantially U-shaped cross section, and when attached to the bail, the bail makes contact therewith from end to end thereof. This guard extends from a point substantially adjacent one side of the bail to a point substantially adjacent the other side of the bail, and therefore, the guard extends throughout a relatively large arc which prevents the guard from rotating on the bail. The end portions of the guard are bent so as to form substantially cylindrical portions which snugly grip the bail which prevents the guard from slipping endwise on the bail.

Referring more in detail to the drawings, the improved handle is shown applied to a sheet metal container 1 having ears 2, 2. The handle consists of a wire bail 3 and a sheet metal guard 4. The wire bail 3 is curved and the ends thereof are bent so as to engage the ears 2, 2. This bail is of the usual construction. The guard 4 is formed from a sheet metal blank which is substantially lenticular in shape, that is, the side edges of the blank are similarly curved and are convexed, forming a blank which tapers from the center portion thereof toward its ends. This blank is curved so as to conform to the bail from end to end thereof. The blank is also curved so that throughout the greater portion of its length it is U-shaped in cross section. The guard thus formed is applied to the bail and the bail placed in contact with the bottom portion 5 of said guard. The end portions of the guard for a distance back from each end are bent so as to substantially encircle the bail. The outer edges of the guard at said end portions are indicated at 6, 6 (see Figs. 4 and 5), and it is noted that they are slightly spaced from each other, which enables the end portions to be bent so as to grip tightly on to the bail. The under face of the guard conforms to the curvature of the bail. The upper edges of the guard are curved, and these curved edges substantially merge into the curvature of the outer face of the bail. The guard 4 extends from a point 7 adjacent one side of the pail to a point 8 adjacent the other side of the pail, so that the guard engages the bail throughout an arc extending from the point 7 to the point 8. This long range engagement of the guard with the bail prevents the guard from rotating on the bail. The cylindrical end portions of the guard gripping the bail prevent the guard from sliding endwise on the bail. As clearly shown in Fig. 3, the underneath portion of the guard is curved, and forms a very efficient carrying grip for the pail, one in which there are no sharp edges of the metal coming in contact with the hand, and the extent of grip of the hand is very much larger than would be the case if there were no guard. By this construction, a guard is formed for the bail which can be made up very cheaply and attached to the bail and become a rigid part thereof, thus forming an efficient handle for the pail whereby the same may be carried even when very heavy materials are placed in the pail.

Having thus described the invention, what we claim as new and desire to secure by Letters-Patent, is—

A handle for pails comprising a curved wire bail and a sheet metal hand guard having its longitudinal center portion in contact with and located within the curve of said bail, said guard being formed from a symmetrical lenticular-shaped blank and curved transversely away from the pail to a substantially U-shaped cross-section of height and width gradually tapering from the middle towards each end, the end portions of the guard being bent to substantially encircle and grip the bail whereby the guard and the bail are rigidly and permanently secured together so that they stiffen and support each other, said guard being also curved longitudinally to conform to the bail and extending from a point adjacent the one side of the pail to a point adjacent the other side thereof, whereby the bail is prevented from bending, and whereby the engagement between the bail and the guard through a long arc will prevent a rotation of the guard about the bail, and in conjunction with the tapered shape of the guard will stiffen the guard to prevent a narrowing of the U-shaped cross-section under load.

In testimony whereof, we affix our signatures.

WILLIAM W. HODGSON.
JOSEPH J. ENGELMAN.